United States Patent
Wilby et al.

(10) Patent No.: US 8,200,447 B2
(45) Date of Patent: Jun. 12, 2012

(54) MEASURING APPARATUS

(75) Inventors: Robert John Wilby, Bristol (GB);
Adrian Kiermasz, Bristol (GB)

(73) Assignee: Metryx Limited, Bristol (GB)

( * ) Notice: Subject to any disclaimer, the term of this patent is extended or adjusted under 35 U.S.C. 154(b) by 0 days.

(21) Appl. No.: 13/008,312

(22) Filed: Jan. 18, 2011

(65) Prior Publication Data
US 2011/0119009 A1 May 19, 2011

Related U.S. Application Data

(62) Division of application No. 11/868,746, filed on Oct. 8, 2007, now Pat. No. 7,892,863.

(30) Foreign Application Priority Data

Oct. 11, 2006 (GB) .................................. 0620196.6

(51) Int. Cl.
*G06F 19/00* (2006.01)
(52) U.S. Cl. ..................................... 702/81; 73/862.381
(58) Field of Classification Search .................... 702/81; 73/862.381
See application file for complete search history.

(56) References Cited

U.S. PATENT DOCUMENTS

| | | | | |
|---|---|---|---|---|
| 4,875,434 A * | 10/1989 | Maejima et al. | ................. | 118/52 |
| 5,476,176 A * | 12/1995 | Gregerson et al. | ............ | 206/711 |
| 5,844,664 A * | 12/1998 | Van Kimmenade et al. | ... | 355/53 |
| 6,102,777 A * | 8/2000 | Duescher et al. | ................ | 451/36 |
| 6,149,506 A * | 11/2000 | Duescher | ......................... | 451/59 |
| 6,262,582 B1 * | 7/2001 | Barringer et al. | ........ | 324/756.01 |
| 6,604,295 B2 * | 8/2003 | Nishimura et al. | ............. | 33/554 |
| 6,922,603 B1 * | 7/2005 | Bailey, III | ...................... | 700/121 |
| 7,349,223 B2 * | 3/2008 | Haemer et al. | ................. | 361/767 |
| RE40,774 E * | 6/2009 | van Engelen et al. | ........... | 355/72 |
| 7,811,854 B2 * | 10/2010 | Gabara | ......................... | 438/107 |
| 7,892,863 B2 * | 2/2011 | Wilby et al. | ..................... | 438/14 |
| 7,952,373 B2 * | 5/2011 | Mok et al. | ................. | 324/754.14 |
| 2003/0099097 A1 * | 5/2003 | Mok et al. | ...................... | 361/767 |
| 2004/0223309 A1 * | 11/2004 | Haemer et al. | ................. | 361/767 |
| 2008/0087106 A1 * | 4/2008 | Wilby et al. | .............. | 73/862.381 |
| 2010/0061143 A1 * | 3/2010 | Carley | ............................ | 365/154 |
| 2010/0237738 A1 * | 9/2010 | Smith et al. | .................... | 310/309 |
| 2010/0258951 A1 * | 10/2010 | Gabara | ............................ | 257/777 |
| 2011/0119009 A1 * | 5/2011 | Wilby et al. | ..................... | 702/81 |

\* cited by examiner

*Primary Examiner* — Laura Menz
(74) *Attorney, Agent, or Firm* — Stites & Harbison PLLC; Douglas E. Jackson

(57) ABSTRACT

Measuring apparatus for monitoring the position of the center of mass of a semiconductor wafer is disclosed. The apparatus includes a wafer support (14) with a ledge for supporting an edge of a wafer (2) when it is lifted at a detection point by a probe (16). The probe (16) is connected to a force sensor (18) which senses a force due to a moment of the wafer about a fulcrum (4) on the wafer support (14). Moment measurements are taken at a plurality of detection points and a processing unit calculates the position of the center of mass from the moment measurements. Changes in wafer mass distribution (e.g. due to faulty treatment steps) which cause movement of the center of mass can be detected.

12 Claims, 3 Drawing Sheets

MEASURING APPARATUS

CROSS REFERENCE TO RELATED APPLICATIONS

This application is a divisional application of U.S. application Ser. No. 11/868,746, filed Oct. 8, 2007 now U.S. Pat. No. 7,892,863 (which is hereby incorporated by reference).

FIELD OF THE INVENTION

The present invention relates to measuring apparatus for monitoring the fabrication process of a semiconductor wafer.

BACKGROUND OF THE INVENTION

Microelectronic devices are fabricated on semiconductor wafers using a variety of techniques, e.g. including deposition techniques (CVD, PECVD, PVD, etc) and removal techniques (e.g. chemical etching, CMP, etc). Semiconductor e.g. silicon wafers may be further treated in ways that alter their mass distribution e.g. by cleaning, ion implantation, lithography and the like. These treatment techniques typically cause a change in the mass distribution at or on the surface of the semiconductor wafer. The configuration of the changes to the surface are often vital to the functioning of the device, so it is desirable for quality control purposes to assess wafers during production in order to determine whether they have the correct configuration.

A number of existing measurement techniques are known. For etching treatment, one known technique is to break a treated wafer and perform a detailed analysis of its cross-section. If the analysis shows treatment to have been successful, it is assumed that the batch of wafers manufactured at the same time as the tested (broken) wafer also have the correct configuration. The disadvantage of this process is that the broken wafers cannot be used and are therefore wasted, and that the process is typically interrupted (i.e. fabrication stopped) every time a wafer from a batch is tested. Continuous production is therefore not feasible.

Other known measurement techniques depend on the type of treatment or the properties of materials created by the treatment. For example, treated wafers can be measured using ellipsometry when they contain dielectrics or wafers can be tested using resistivity probes when conductive metals are deposited thereon.

SUMMARY OF THE INVENTION

At its most general, the present invention proposes a device for determining, for a plurality of detection points on a wafer, a moment exerted due to the weight of the wafer. The determined moments for the detection points may be used to monitor the position of a centre of mass corresponding to a mass distribution for a given wafer. Any movement in the centre of mass may be interpreted to indicate an uneven e.g. faulty treatment step.

It is known to provide very precise weighing apparatus for wafers to act as quality control monitors. However, such devices are arranged only to detect the total mass of the wafers. Provided that this mass is within a predetermined range, there is a high probability that the wafer is fabricated properly. This is not a measurement of the topology of the wafer. However, in practice, the value measured by the weighing detector gives a good indication of the likelihood of errors in fabrication.

The present invention detects an additional piece of information that can be used to check for changes in mass distribution for a wafer. According to a first aspect of the invention, there may be provided apparatus for monitoring a fabrication process of a semiconductor wafer, the apparatus having: a pivot element for providing a plurality of fulcrums about which the wafer is pivotable; and a weighing unit arranged to measure a force at each of a plurality of detection points on the wafer, the force at each detection point being due to a moment of the wafer about a respective fulcrum. Preferably, the apparatus including a processing unit arranged to calculate the moment at each detection point. The apparatus may therefore be arranged to take a set of moment measurements which can be used to calculate a position of a centre of mass for the wafer. Each moment measurement can give information about the mass distribution between two regions of the wafer separated by a line normal to the pivot axis through the detection point. For example, in a substantially free system, the centre of mass may lie on the line through the detection point.

By taking a plurality of measurements, a set of simultaneous equations for mass distribution in a plurality of regions can be generated and solved to accurately locate the centre of mass. The processing unit may be arranged to generate and solve these equations. Thus, the pivot element is preferably arranged to provide a plurality of fulcrums about which the wafer is pivotable.

After locating the centre of mass, the detection point may be located there to detect the total mass of the wafer.

The present invention may be applied in particular to assess the effect of one or more steps in the fabrication process. The apparatus may therefore be adapted to determine a difference in centre of mass location for a semiconductor wafer following treatment. Thus, the apparatus may be used to measure moments at a plurality of detection points before one or more treatment steps and then to measure moments at the same or different detection points after treatment to enable a differential comparison to take place. The detection points may be chosen to enable the position of the centre of mass relative to a known reference point on the wafer to be determined. In this way, the mass distribution of mass deposited or etched away during the treatment step(s) may be determined. Thus, the measurements may be used to detect a change in the size of the total mass of the wafer and a movement in the location of the centre of mass due to one or more steps in the fabrication process.

Since it is a moment due to the weight of the wafer that is being measured, the technique of the present invention is independent of the material of the substrate and the type of process that has been carried out, which may make it more flexible and more cost effective than conventional techniques. The semiconductor wafer may therefore be of any type, e.g. silicon, and its non-uniformity is preferably the result of wafer treatment.

Herein, wafer treatment covers any process that alters the mass distribution (usually at the surface) of the semiconductor wafer. Preferably, wafer treatment includes deposition processes (CVD, PECVD, PVD, etc) and etching (material removal) processes (including wet etching, dry etching and CMP).

The mass distribution may be presented as variations in the wafer treatment layer thickness, e.g. by assigning a predetermined density to the wafer treatment layer to convert mass differences into thickness differences.

The present invention may be adaptable to provide a wafer measurement technique for monitoring mass distribution of a wafer that is applicable to all types of wafer treatment. Preferably, it is implemented in a continuous process without the need to break treated wafers. Preferably, it is implemented on product wafers.

Preferably, the pivot element and weighing unit are arranged to support fully the weight of the wafer. In one embodiment, the pivot element has two separated support elements for contacting the wafer and defining a pivot axis therebetween. The apparatus may therefore provide a three-point support structure for the wafer, e.g. with the support points in a triangular configuration, wherein one of the support points is connected to the weighing unit to detect the moment of the wafer about the pivot axis defined by the other two support points. In a preferred embodiment, each of the support points is connected to the weighing unit (i.e. the functions of the weighing unit and pivot element are provided by the same physical component), such that three moment measurements (each about a different pivot axis) may be taken for a single position of the wafer relative to the pivot element/weighing unit. The measurements may be taken sequentially or simultaneously. The combined pivot element/weighing unit may have more than three support points.

Preferably, the wafer is substantially horizontal during measurement to minimise errors. The pivot element and weighing unit may therefore include support surface or elements adapted to contact the underside of the wafer.

In one embodiment, the pivot element includes a surface arranged to lie under the outer edge of the wafer, such that, during detection, the wafer is pivotable about a point on its edge. Thus, in the case where the measured wafer is circular, the pivot element preferably includes an annular support surface arranged to freely support the wafer such that the fulcrum on which the wafer pivots during measurement selects itself according to the location of the detection point and centre of mass. In a freely supported structure, the fulcrum lies on a line joining the detection point and the centre of mass. Accordingly, the distance between the detection point and the fulcrum can be calculated in order to determine the moment. Preferably, the processing unit is arranged to determine the distance between the fulcrum (pivot axis) and the detection point.

In one embodiment, the pivot element supports the wafer independently of the weighing unit. The weighing unit may include a probe located under the pivot element, wherein the apparatus includes a movement mechanism to cause relative movement between the probe and pivot element to enable the probe to contact the underside of the wafer at each of the detection points.

Preferably, the probe is connected to a force sensing device, which is arranged to measure the force exerted on the probe due to the moment of the wafer about pivot axis.

The weighing unit may have a plurality of probes, e.g. one for each of the detection points. Preferably, however, the weighing unit includes one probe and force sensing device. Preferably, the weighing unit includes a weighing instrument of the type disclosed in WO02/03449. Preferably it has a readability of 0.01 mg over a range of 0 to 130 g. More preferably, it has a measurement resolution of 1 μg. The measurement repeatability is ±80 μg for wafers with a diameter of 300 mm. More preferably, the instrument has a repeatability of better than 0.03 mg.

External factors, such as pressure, temperature and the like may affect the accuracy of the weighing unit. Thus, the weighing unit preferably includes temperature, pressure and/or humidity monitors to determine the local temperature, pressure and humidity to enable measurements to be adjusted accordingly. Preferably, the weighing unit includes a heater that is arranged to maintain the measurement environment at substantially constant temperature, e.g. within ±0.1° C. The measurement environment is preferably maintained within 5° C. of ambient temperature. FIG. 6 shows how the weight of a standard wafer varies over a period of time simply due to the effect of different atmospheric and environmental conditions on the measurement apparatus. Such conditions are preferably monitored in order for them to be compensated for in the measurement technique of the present invention.

Preferably, the movement mechanism includes a tracking device arranged to determine the precise positional relationship between the pivot element (i.e. pivot axis) and probe (i.e. detection point).

Preferably, the pivot element is adapted to receive the wafer in a predetermined orientation. This may permit the location of the pivot axis and detection points with respect to the wafer as a whole or with respect to a fabricated pattern on the surface of the water to be known. For example, the pivot element may have protrusions which are receivable in notches formed in the wafer. Alternatively or additionally, the alignment of the wafer on the pivot element may be adjustable e.g. finely tuned by positioning the fabricated or partially fabricated pattern on the wafer (i.e. using the wafer topography) at a predetermined orientation or location.

The tracking device may be arranged to determine the position of the probe relative to a single point (origin) on the pivot element to determine the normal distance between the pivot axis and the detection point. The tracking device may be based on a two dimensional linear scale (e.g. x, y coordinates) or on a two dimensional radial system (e.g. r, θ coordinates).

The probe may be movable between detection points on the back of the wafer by dragging across the lower surface of the wafer. Preferably a low friction mechanism, e.g. a PTFE wheel as the probe tip, is provided between the probe and the lower surface of the wafer to prevent or minimize any effect on the mass distribution of the wafer that the tracking will have. The force exerted on the weighing unit due the moment of the wafer may be measured in a continuous fashion as the probe is moved across the back surface of the wafer.

Alternatively, the probe may be applied discretely at each of the detection points. In this case, there is no direct rubbing between the probe and back surface of the wafer, which can avoid problems associated with depositing or removing particles from the wafer.

In another aspect, the present invention may include a method of monitoring a mass distribution of a semiconductor wafer during a fabrication process, the method including: measuring the force on a force sensing device due to the moment of the wafer about a pivot axis for each of a plurality of detection points on the wafer; calculating the moment at each detection point by determining a normal distance from the detection point to the pivot axis; and determining movement of centre of mass of the wafer using the calculated moments.

Preferably, there are at least three detection points.

As mentioned above, the present invention may be applied to assess the effect of one or more steps in a semiconductor fabrication process. The method may therefore include determining a difference in position of the centre of mass calculated from moment measurements taken before and after the one or more steps.

BRIEF DESCRIPTION OF THE DRAWINGS

An example of the present invention will now be described in detail with reference to the accompanying drawings in which.

DETAILED DESCRIPTION

Figure 1:
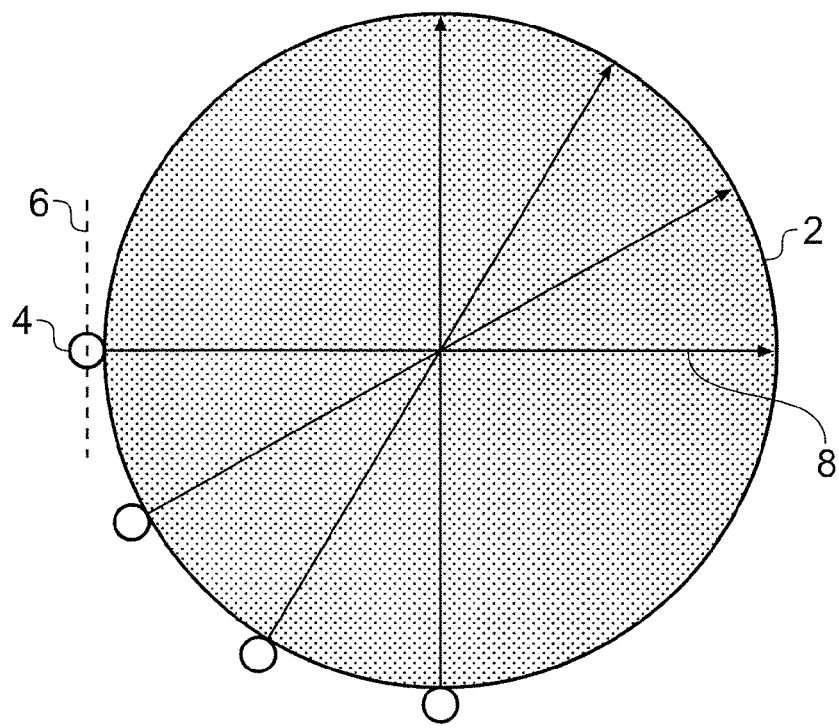
FIG. 1 shows a schematic plan view of a method of measuring moments which is an embodiment of the invention.

FIG. 1 shows a plan view of a wafer measurement process according to the present invention. A circular semiconductor wafer 2 is pivotally supported on its edge. The wafer 2 can pivot about a plurality of fulcrums 4 around the edge (circumference) of the wafer 2. FIG. 1 illustrates four positions for the fulcrum 4. For a perfectly uniform wafer, the centre of mass is at the centre of the wafer and the wafer is pivotable about a pivot axis 6 at each fulcrum that is normal to a diameter 8.

Figure 2:
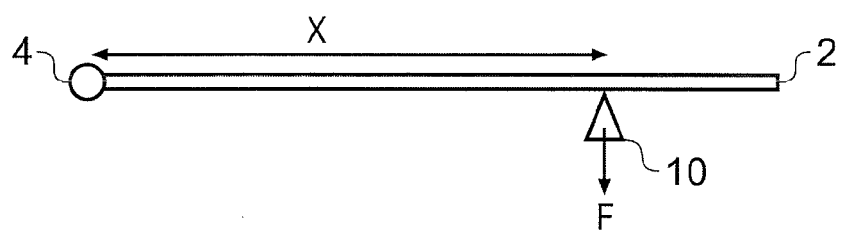
FIG. 2 shows a side view of the process of FIG. 1.

FIG. 2 shows a side view of the arrangement shown in FIG. 1. The wafer 2 is freely pivotable about the fulcrum 4, but is supported in a horizontal orientation by weighing probe 10. The probe 10 is attached to a force sensor (not shown) to detect the force exerted by the weight of the wafer 2 and thereby calculate the moment of the wafer 2 about the fulcrum 4. In FIG. 2, the moment is the sensed force F multiplied by the distance x to the fulcrum 4.

The probe 10 is movable to take moment measurements along a plurality of diameters (for a plurality of fulcrums), e.g. as shown in FIG. 1.

The probe 10 is connected to a force sensor (e.g. load cell) which is arranged accurately to detect the force exerted on the probe 10 by the weight of the wafer 2. A tracking mechanism (not shown) monitors the position of the fulcrum 4 and the position of the probe 10 to determine precisely the distance between the detection point and fulcrum 4. Details of the detected force and the position of the probe 10 and fulcrum 4 are provided to a computer program that is arranged to store a set of values that are representative of a mass distribution (i.e. a position of centre of mass) of the wafer 2. The wafer 2 is then treated. After treatment, the above steps are repeated for the same detection point locations, and the computer program compares the results with the stored values to determine any difference in the position of the centre of mass that may be caused by a change in mass distribution resulting from the treatment step.

Figure 3:
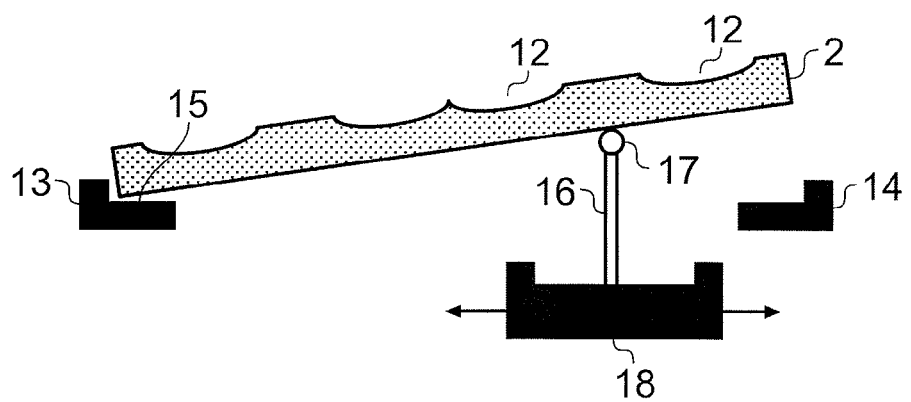
FIG. 3 shows a schematic side view of apparatus for measuring moments that is an embodiment of the invention.

FIG. 3 shows apparatus for monitoring semiconductor wafers. Irregularities in the thickness of the wafer 2 are represented in an exaggerated manner by craters 12. An annular wafer support 14 is provided on which the wafer 2 may lie at rest in a horizontal orientation. The wafer support 14 has a ledge 15 around its inner surface for supporting the outer part of the underside of the wafer 2. An upstanding safety wall 13 on the wafer support 14 prevents the wafer 2 from accidentally moving sideways out of the wafer carrier 14. The ledge 15 acts as the fulcrum 4 shown in FIG. 1. A probe 16 connected to a force sensor 18 is arranged to contact the underside of the wafer 2 through a central hole in the annular support 14. In this embodiment the probe 16 and force sensor 18 are arranged to move relative to the wafer support 14. The probe 16 can therefore contact different points on the underside of the wafer 2.

In this embodiment, the probe is arranged to take the load the wafer 2 with respect to the wafer carrier 14. Since the wafer 2 is freely supported by the wafer carrier, this results in the wafer being supported between two points: the point of contact of the probe at the underside of the wafer and a fulcrum (pivot point) on the ledge 15 which lies on the line connecting the contact point and the centre of mass of the wafer. The force sensed by sensor 18 will therefore be due to the moment of the wafer about the fulcrum.

Figure 4:
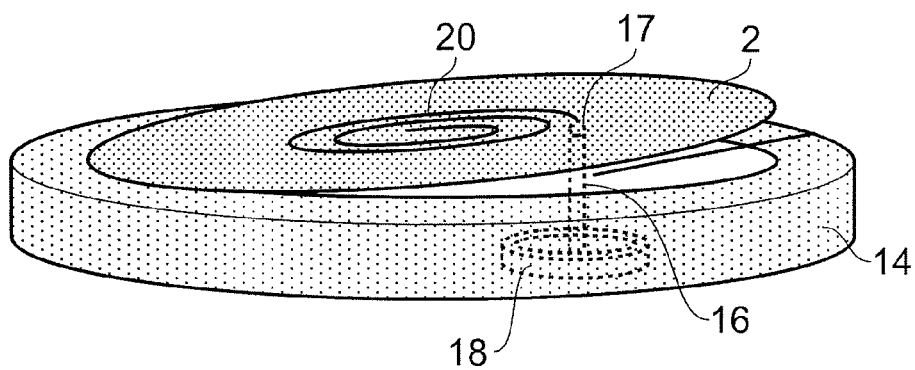
FIG. 4 shows a perspective view of the apparatus of FIG. 3 when in use.

The probe 16 and force sensor 18 may be arranged to move with respect to the wafer carrier 14. FIG. 4 shows an arrangement where the point of contact between the probe 16 and underside of the wafer 2 moves in an outward spiral 20 away from the centre of the wafer 2. The point at which the probe 16 contacts the underside of the wafer 2 is provided with a low-friction mechanism 17 e.g. to reduce or minimize any effect that tracking the probe over the underside of the wafer 2 may have on the measurements.

Alternatively, the probe 16 and force sensor 18 may take point-by-point measurements at discrete points on the underside of the wafer 2. The probe can be lowered out of contact from the wafer 2 before being moved to the next detection point so that there is no dragging along the surface of the wafer 2.

As before, a tracking mechanism (not shown) is provided so that the position of the force sensor 18 relative to the wafer carrier 14 and to the position of the fulcrum is known. The position of the fulcrum and force sensor and the force measured by the force sensor 18 is communicated to a computer program in order to determine a position for the centre of mass of the wafer, whereby changes in the mass distribution may be detected by variation in the position of the wafer's centre of mass.

Figure 5:
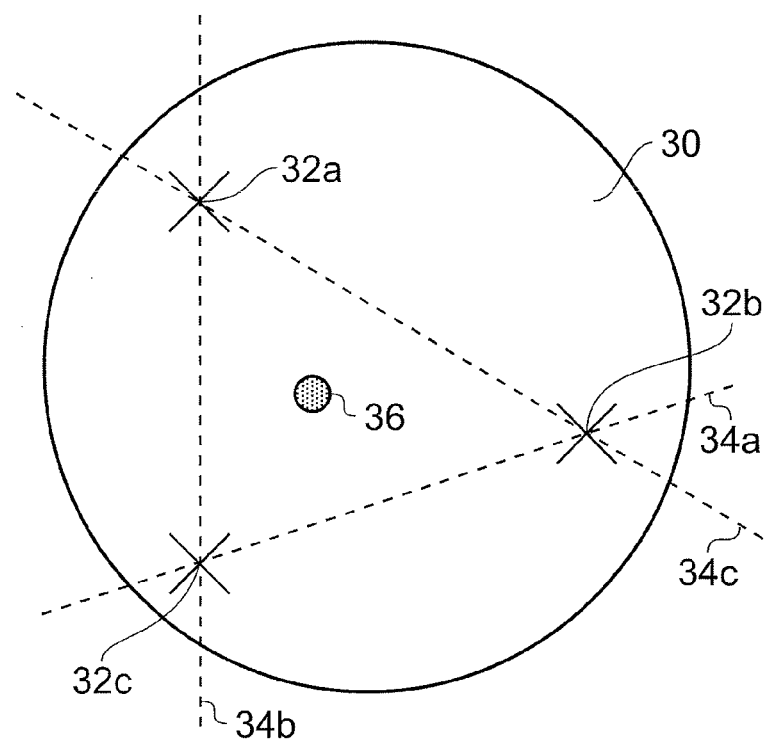
FIG. 5 shows a schematic plan view of another method of measuring moments which is another embodiment of the invention.
Figure 6:
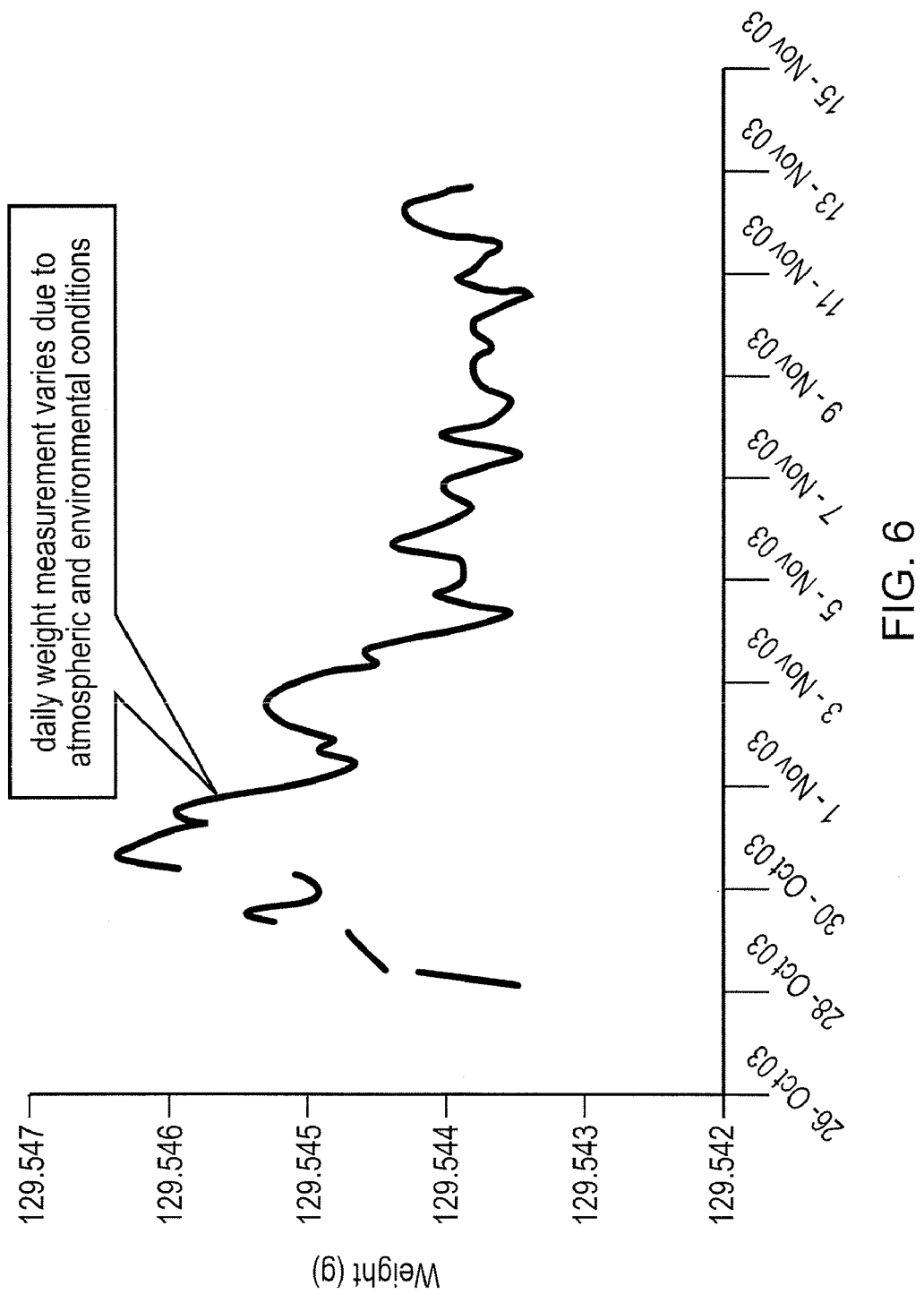
FIG. 6 shows a chart illustrating the effect of atmospheric conditions on wafer weight measurements and is described above.

FIG. 5 shows another method of measuring moments. Here the wafer 30 is supported at three points 32a, 32b, 32c. Each of the support points 32 has a force sensor (not shown) associated with it. In this arrangement, the wafer 30 is pivotable about each of three axes 34a, 34b, 34c, each defined by two of the support points to allow a moment due to the wafer to be measured at the other support point. Thus, a moment about axis 34a is detectable at point 32a, a moment about axis 34b is detectable at point 32b, and a moment about axis 34c is detectable at point 32c. By knowing the relative positions of the support points 32, the normal distance from each pivot axis to its detection point can be determined in order to calculate the moment. Additionally, the total mass of the wafer is measured (e.g. by moving one of the support points to the centre of mass 36).

The above measurement steps are repeated after one or more steps in the fabrication of the wafer. Measurements are taken at the same points, e.g. by aligning the wafer with the support structure using a notch (not shown), as is known in fabrication methods. A difference in the measured moments and total mass may be indicative of a change in mass distribution that is reflected in the position of the centre of mass 36 and a change in overall mass. It may be known that a given treatment step or steps should cause a certain change in mass distribution. The result may therefore be compared to this expected change to assess whether or not the treatment was satisfactory.

The invention claimed is:

1. Apparatus for monitoring a fabrication process of a semiconductor wafer, the apparatus having:

a pivot element for providing a plurality of fulcrums about which the wafer is pivotable; and a weighing unit arranged to measure a force at each of a plurality of detection points on the wafer, the force at each detection point being due to a moment of the wafer about a respective fulcrum.

2. Apparatus according to claim 1 including a processing unit arranged to calculate the moment at each detection point.

3. Apparatus according to claim 2, wherein the processing unit is arranged to calculate the position of the wafer's centre of mass from the calculated moments.

4. Apparatus according to claim 1, wherein the pivot element and weighing unit are arranged to support fully the weight of the wafer.

5. Apparatus according to claim 4, wherein the pivot element has two separated support elements for contacting the wafer and defining a pivot axis therebetween and the weighing unit includes a probe connected to a third support element which forms a triangular configuration with the support elements of the pivot element, whereby the weighing unit is arranged to detect the moment of the wafer about the pivot axis defined by the other two support points.

6. Apparatus according to claim 4, wherein each of three support points for the wafer are connected to the weighing unit to permit three moment measurements for a single position of the wafer relative to the support points.

7. Apparatus according to claim 4, wherein the pivot element includes an annular ledge arranged to lie under the outer edge of the wafer, such that, during detection, the wafer is pivotable about a point on its edge.

8. Apparatus according to claim 1, wherein the weighing unit includes a probe connected to a force sensing device, which is arranged to measure the force exerted on the probe due to the moment of the wafer about a pivot axis.

9. Apparatus according to claim 8, wherein the movement mechanism includes a tracking device arranged to determine the precise positional relationship between the pivot element and probe.

10. Apparatus according to claim 9, wherein the probe may be movable between detection points on the back of the wafer.

11. Apparatus according to claim 1, wherein the pivot element is adapted to receive the wafer in a predetermined orientation.

12. Apparatus according to claim 1 including one or more monitoring devices arranged to determine local temperature, pressure and humidity to enable measurements to be adjusted for atmospheric buoyancy.

* * * * *